(12) United States Patent  
Armbruster et al.

(10) Patent No.: US 9,139,019 B2  
(45) Date of Patent: Sep. 22, 2015

(54) MARKING DEVICE FOR MARKING AN OBJECT WITH MARKING LIGHT

(75) Inventors: Kevin L. Armbruster, Chicopee, MA (US); Brad D. Gilmartin, Gardner, MA (US); Peter J. Kueckendahl, Bad Oldesloe (DE); Bernard J. Richard, Dudley, MA (US); Daniel J. Ryan, Sycamore, IL (US)

(73) Assignee: Alltec Angewandte Laserlicht Technologie GmBH, Selmsdorf (DE)

( * ) Notice: Subject to any disclaimer, the term of this patent is extended or adjusted under 35 U.S.C. 154(b) by 0 days.

(21) Appl. No.: 14/342,493

(22) PCT Filed: Jul. 19, 2012

(86) PCT No.: PCT/EP2012/003062  
§ 371 (c)(1),  
(2), (4) Date: Mar. 3, 2014

(87) PCT Pub. No.: WO2013/034207  
PCT Pub. Date: Mar. 14, 2013

(65) Prior Publication Data  
US 2014/0253661 A1    Sep. 11, 2014

(30) Foreign Application Priority Data  
Sep. 5, 2011    (EP) .................................... 11007178

(51) Int. Cl.  
*B41J 2/435*    (2006.01)  
*B23K 26/00*    (2014.01)  
(Continued)

(52) U.S. Cl.  
CPC ............. *B41J 2/455* (2013.01); *B23K 26/0084* (2013.01); *B23K 26/03* (2013.01); *B23K 26/0604* (2013.01); *B23K 26/0643* (2013.01); *B23K 26/0648* (2013.01); *B23K 26/0807* (2013.01);  
(Continued)

(58) Field of Classification Search  
USPC .......... 347/110, 224, 225; 219/121.6, 121.61, 219/121.68, 121.69, 121.76–121.8  
See application file for complete search history.

(56) References Cited

U.S. PATENT DOCUMENTS 3,705,999 A    12/1972    Hermann et al.  
3,919,663 A    11/1975    Caruolo et al.  
(Continued)

FOREIGN PATENT DOCUMENTS

DE    4029187 A1    3/1992  
DE    4212390 A1    10/1993  
(Continued)

OTHER PUBLICATIONS

International Application No. PCT/EP2012/003073, Preliminary Report on Patentability, Sep. 26, 2013, 14 pages.  
(Continued)

*Primary Examiner* — Hai C Pham  
(74) *Attorney, Agent, or Firm* — Hoffman Warnick LLC

(57) ABSTRACT

The invention relates to a marking device for marking an object (1) with marking light. The marking device comprises a plurality of marking modules (10a-d) for emitting marking light, and a base unit (20) to which the plurality of marking modules (10a-d) is connected wherein the base unit (20) comprises a control unit (25) for controlling the plurality of marking modules (10a-d). The plurality of marking modules (10a-d) comprises at least a first marking module (10a) and a second marking module (10b) which employ different marking technologies.

12 Claims, 7 Drawing Sheets

(51) Int. Cl.

| | | |
|---|---|---|
| *B41J 2/455* | (2006.01) | |
| *B23K 26/03* | (2006.01) | |
| *B23K 26/06* | (2014.01) | |
| *B23K 26/08* | (2014.01) | |
| *B23K 26/36* | (2014.01) | |
| *H01S 3/07* | (2006.01) | |
| *H01S 3/08* | (2006.01) | |
| *H01S 3/083* | (2006.01) | |
| *H01S 3/0971* | (2006.01) | |
| *H01S 3/223* | (2006.01) | |
| *H01S 3/23* | (2006.01) | |
| *H01S 3/00* | (2006.01) | |
| *H01S 3/03* | (2006.01) | |
| *H01S 3/036* | (2006.01) | |
| *H01S 3/041* | (2006.01) | |

(52) U.S. Cl.
CPC .............. *B23K 26/365* (2013.01); *H01S 3/076* (2013.01); *H01S 3/005* (2013.01); *H01S 3/03* (2013.01); *H01S 3/036* (2013.01); *H01S 3/041* (2013.01); *H01S 3/0835* (2013.01); *H01S 3/08059* (2013.01); *H01S 3/0971* (2013.01); *H01S 3/2232* (2013.01); *H01S 3/2383* (2013.01)

(56) References Cited

U.S. PATENT DOCUMENTS

| | | |
|---|---|---|
| 4,131,782 A | 12/1978 | Einstein et al. |
| 4,189,687 A | 2/1980 | Wieder et al. |
| 4,376,496 A | 3/1983 | Sedam et al. |
| 4,467,334 A | 8/1984 | Anzai |
| 4,500,998 A | 2/1985 | Kuwabaraet et al. |
| 4,652,722 A | 3/1987 | Stone et al. |
| 4,720,618 A | 1/1988 | Stamer et al. |
| 4,727,235 A | 2/1988 | Stamer et al. |
| 4,744,090 A | 5/1988 | Freiberg |
| 4,907,240 A | 3/1990 | Klingel |
| 4,912,718 A | 3/1990 | Klingel |
| 4,991,149 A | 2/1991 | Maccabee |
| 5,012,259 A | 4/1991 | Hattori et al. |
| 5,109,149 A | 4/1992 | Leung |
| 5,115,446 A | 5/1992 | Von Borstel et al. |
| 5,229,573 A | 7/1993 | Stone et al. |
| 5,229,574 A | 7/1993 | Stone |
| 5,268,921 A | 12/1993 | McLellan |
| 5,337,325 A | 8/1994 | Hwang |
| 5,339,737 A | 8/1994 | Lewis et al. |
| 5,431,199 A | 7/1995 | Benjay et al. |
| 5,572,538 A | 11/1996 | Saitoh et al. |
| 5,592,504 A | 1/1997 | Cameron |
| 5,646,907 A | 7/1997 | Maccabee |
| 5,706,305 A | 1/1998 | Yamane et al. |
| 5,729,568 A | 3/1998 | Opower et al. |
| 5,815,523 A | 9/1998 | Morris |
| 5,982,803 A | 11/1999 | Sukhman et al. |
| 6,050,486 A * | 4/2000 | French et al. .................. 235/101 |
| 6,057,871 A | 5/2000 | Peterson |
| 6,069,843 A | 5/2000 | DiMarzio et al. |
| 6,122,562 A * | 9/2000 | Kinney et al. .................. 700/121 |
| 6,141,030 A | 10/2000 | Fujita et al. |
| 6,229,940 B1 | 5/2001 | Rice et al. |
| 6,263,007 B1 | 7/2001 | Tang |
| 6,303,930 B1 * | 10/2001 | Hagiwara ........................ 850/10 |
| 6,370,884 B1 | 4/2002 | Kelada |
| 6,421,159 B1 | 7/2002 | Sutter et al. |
| 6,539,045 B1 * | 3/2003 | Von Borstel et al. ............ 372/81 |
| 6,621,838 B2 | 9/2003 | Naito et al. |
| 6,856,509 B2 | 2/2005 | Lin |
| 6,915,654 B2 | 7/2005 | Johnson |
| 7,058,100 B2 | 6/2006 | Vetrovec et al. |
| 7,346,427 B2 | 3/2008 | Hillam et al. |
| 7,496,831 B2 * | 2/2009 | Dutta et al. ................... 715/207 |
| 7,521,651 B2 * | 4/2009 | Gross et al. ............... 219/121.71 |
| 7,543,912 B2 | 6/2009 | Anderson et al. |
| 7,565,705 B2 | 7/2009 | Elkins et al. |
| 8,263,898 B2 * | 9/2012 | Alber ........................ 219/121.64 |
| 2001/0030983 A1 * | 10/2001 | Yuri et al. .................. 372/29.023 |
| 2003/0010420 A1 | 1/2003 | Morrow |
| 2003/0123040 A1 | 7/2003 | Almogy |
| 2003/0147443 A1 | 8/2003 | Backus |
| 2005/0056626 A1 | 3/2005 | Gross et al. |
| 2005/0094697 A1 | 5/2005 | Armier et al. |
| 2006/0161381 A1 | 7/2006 | Jetter |
| 2006/0191063 A1 | 8/2006 | Elkins et al. |
| 2007/0138151 A1 * | 6/2007 | Tanaka et al. ............. 219/121.65 |
| 2007/0247499 A1 | 10/2007 | Anderson et al. |
| 2008/0094636 A1 | 4/2008 | Jin et al. |
| 2009/0010285 A1 | 1/2009 | Dubois et al. |
| 2009/0245318 A1 | 10/2009 | Clifford, Jr. |
| 2009/0323753 A1 | 12/2009 | Gmeiner et al. |
| 2011/0102537 A1 * | 5/2011 | Griffin et al. .................. 347/237 |
| 2011/0227972 A1 | 9/2011 | Taniguchi et al. |
| 2014/0224778 A1 | 8/2014 | Armbruster et al. |

FOREIGN PATENT DOCUMENTS

| | | |
|---|---|---|
| DE | 10125447 A1 | 1/2002 |
| EP | 0157546 A2 | 10/1985 |
| EP | 0427229 A3 | 5/1991 |
| EP | 1184946 A1 | 3/2002 |
| GB | 1495477 A | 12/1977 |
| GB | 2211019 A | 6/1989 |
| GB | 2249843 A | 5/1992 |
| GB | 2304641 A | 3/1997 |
| JP | 63094695 A | 4/1988 |
| JP | 5129678 A | 5/1993 |
| JP | 2001276986 A | 10/2001 |
| JP | 2007032869 A | 2/2007 |
| JP | 2007212118 A | 8/2007 |
| JP | 2011156574 A | 8/2011 |
| WO | 0046891 A1 | 8/2000 |
| WO | 0107865 A2 | 2/2001 |
| WO | 0243197 A2 | 5/2002 |

OTHER PUBLICATIONS

International Application No. PCT/EP2012/003072, Preliminary Report on Patentability, Mar. 12, 2014, 7 pages.
International Application No. PCT/EP2012/003071, Preliminary Report on Patentability, Mar. 12, 2014, 5 pages.
International Application No. PCT/EP2012/003070, Preliminary Report on Patentability, Mar. 12, 2014, 7 pages.
International Application No. PCT/EP2012/003069, Preliminary Report on Patentability, Nov. 27, 2013, 32 pages.
International Application No. PCT/EP2012/003068, Preliminary Report on Patentability, Mar. 12, 2014, 5 pages.
International Application No. PCT/EP2012/003067, Preliminary Report on Patentability, Nov. 28, 2013, 19 pages.
International Application No. PCT/EP2012/003066, Preliminary Report on Patentability, Nov. 28, 2013, 19 pages.
International Application No. PCT/EP2012/003065, Preliminary Report on Patentability, Nov. 28, 2013, 21 pages.
International Application No. PCT/EP2012/003064, Preliminary Report on Patentability, Nov. 15, 2013, 18 pages.
International Application No. PCT/EP2012/003063, Preliminary Report on Patentability, Mar. 12, 2014, 5 pages.
International Application No. PCT/EP2012/003062, Preliminary Report on Patentability, Mar. 12, 2014, 6 pages.
International Application No. PCT/EP2012/003061, Preliminary Report on Patentability, Mar. 12, 2014, 6 pages.
International Application No. PCT/EP2012/003073, Search Report and Written Opinion, Dec. 18, 2012, 8 pages.
International Application No. PCT/EP2012/003072, Search Report and Written Opinion, Oct. 8, 2012, 11 pages.
International Application No. PCT/EP2012/003071, Search Report and Written Opinion, Nov. 15, 2012, 9 pages.
International Application No. PCT/EP2012/003070, Search Report and Written Opinion, Oct. 8, 2012, 11 pages.

(56) References Cited

OTHER PUBLICATIONS

International Application No. PCT/EP2012/003069, Search Report and Written Opinion, Sep. 27, 2012, 8 pages.
International Application No. PCT/EP2012/003068, Search Report and Written Opinion, Nov. 15, 2012, 8 pages.
International Application No. PCT/EP2012/003067, Search Report and Written Opinion, Nov. 16, 2012, 7 pages.
International Application No. PCT/EP2012/003066, Search Report and Written Opinion, Nov. 15, 2012, 7 pages.
International Application No. PCT/EP2012/003065, Search Report and Written Opinion, Nov. 16, 2012, 7 pages.
International Application No. PCT/EP2012/003064, Search Report and Written Opinion, Nov. 16, 2012, 7 pages.
International Application No. PCT/EP2012/003063, Search Report and Written Opinion, Nov. 15, 2012, 9 pages.
International Application No. PCT/EP2012/003062, Search Report and Written Opinion, Nov. 15, 2012, 10 pages.
International Application No. PCT/EP2012/003061, Search Report and Written Opinion, Sep. 10, 2012, 9 pages.
U.S. Appl. No. 14/342,503, Final Office Action dated Dec. 18, 2014, 22 pages.
U.S. Appl. No. 14/342,508, Final Office Action dated Dec. 10, 2014, 23 pages.
Final Office Action for U.S. Appl. No. 14/342,487, dated Feb. 2, 2015, 31 pages.
Notice of Allowance and Fee(s) Due for U.S. Appl. No. 14/342,510, dated Feb. 20, 2015, 20 pages.
Notice of Allowance and Fee(s) Due for U.S. Appl. No. 14/342,503, dated Mar. 17, 2015, 11 pages.
Notice of Allowance and Fee(s) Due for U.S. Appl. No. 14/342,508, dated Apr. 1, 2015, 15 pages.
Notice of Allowance and Fee(s) Due for U.S. Appl. No. 14/342,483, dated Apr. 2, 2015, 26 pages.
U.S. Appl. No. 14/342,510, Office Action dated Aug. 1, 2014.
U.S. Appl. No. 14/342,508, Office Action dated Aug. 14, 2014.
U.S. Appl. No. 14/342,503, Office Action dated Aug. 21, 2014.
U.S. Appl. No. 14/342,487, Office Action dated Aug. 14, 2014.
U.S. Appl. No. 14/342,483, Office Action dated Oct. 2, 2014.
Office Action for U.S. Appl. No. 14/342,487, dated Jul. 24, 2015, 17 pages.

* cited by examiner

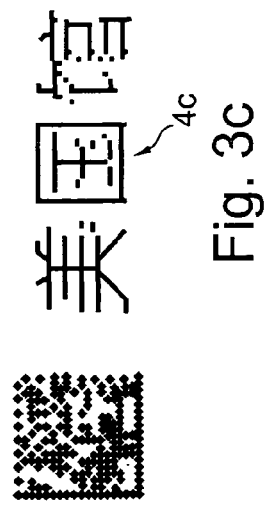
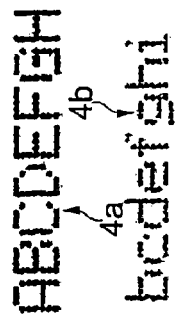
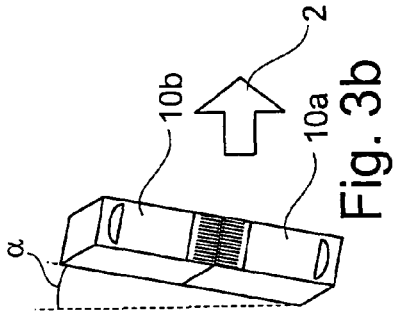
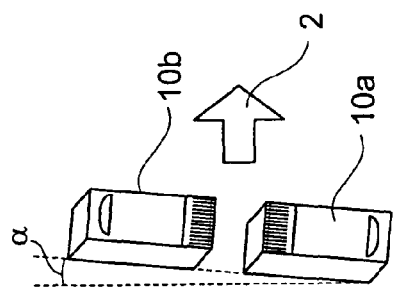
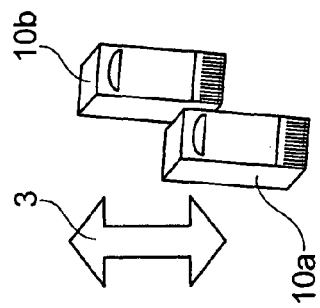
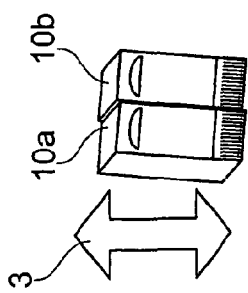
Fig. 2a  Fig. 2b  Fig. 2c
Fig. 3a  Fig. 3b  Fig. 3c

MARKING DEVICE FOR MARKING AN OBJECT WITH MARKING LIGHT

FIELD OF THE INVENTION

The present invention relates to a marking device for marking an object with marking light.

RELATED ART

A generic marking device for marking an object with marking light comprises a plurality of marking modules for emitting marking light, and a base unit to which the plurality of marking modules is connected, wherein the base unit comprises a control unit for controlling the plurality of marking modules.

Such marking devices are used for a variety of different objects, including packaging, e.g. for food or beverage, fruits or labels. Markings may also be produced on pills or labels for postal appliances. The material of these objects may comprise, amongst others, plastics, paper, metals, ceramics, fabrics, composites or organic tissues.

Known marking devices are specialized for marking one or few of the objects enumerated above. Changes in objects to be marked or objects comprising different materials therefore cannot be marked with one conventional marking device.

From US 2001/0030983 A1 a laser device comprising several semiconductor lasers is known. With a condenser lens, emitted laser beams are directed onto the same area.

In U.S. Pat. No. 6,057,871 A, a marking system comprising a plurality of laser diodes is disclosed. There may be three laser diodes of different colours for emitting light that can be mixed to form a variety of other colours.

Subject-matter of U.S. Pat. No. 5,012,259 is an image forming system with three gas lasers that emit light of different wavelengths. The emitted light beams are combined on a common beam path. Another apparatus for exposing a photo sensitive layer with light beams of different wavelengths is described in U.S. Pat. No. 6,141,030 A. In US 20090245318 A1 a laser device with a plurality of lasers which are arranged next to each other is disclosed.

SUMMARY OF THE INVENTION

It is an object of the invention to provide a marking device for marking an object that is particularly well-suited for a broad variety of applications.

This objective is solved with a marking device.

Preferred embodiments are given in the following description, in particular in connection with the attached figures.

According to aspects of the invention, the device of the above mentioned kind is characterized in that the plurality of marking modules comprises at least a first marking module and a second marking module which employ different marking technologies.

It can be regarded as an idea of the invention to provide different marking technologies in one marking device with a common control unit. Dependent on the object to be marked, one or several marking modules with the marking technology being most suited are deployed for the marking process.

An advantage becomes apparent if the object comprises different materials onto which a marking is to be printed or engraved. In that case a plurality of marking modules employing different marking technologies can be activated and used simultaneously. Compared to prior art systems which require several different marking devices for this task, the inventive marking device allows for a space-saving setup which also requires less time consumption.

The marking modules employing different marking technologies may be understood as any marking modules that produce marking light varying in wavelength or intensity, i.e., beam power.

In an inventive marking device, the different marking technologies of the marking modules belong to a group comprising: lasers, in particular solid state lasers, laser diodes, VCSELs (vertical-cavity surface emitting lasers) and gas lasers such as $CO_2$-lasers, HeNe lasers, CO lasers, argon lasers, nitrogen lasers and excimer lasers, or diodes such as LEDs (light emitting diodes) or OLEDs (organic light emitting diodes). For instance, the marking technology of the first marking module may be constituted by gas lasers, whereas the second marking module employs laser diodes. The light emitted by the laser diodes may have a wavelength around 1 µm, whereas the gas lasers, e.g. $CO_2$-lasers, may emit light at ca. 10 µm. Additionally, the beam intensities of the laser diodes and the gas lasers may differ. A wide variety of different objects can then be marked with one marking device. The plurality of marking devices may also comprise other marking devices with marking technologies again differing from those of the first and second marking modules.

Additionally, the marking technologies of at least two marking modules may differ in that the marking light emitted by these marking modules have different wavelength regions. This may be of particular advantage for producing markings on different materials of the object. Preferably, the different wavelength regions may not overlap. In this sense, two marking modules that each comprise at least one CO2-laser may be regarded as employing different marking technologies if these CO2-lasers are adapted or controlled by the control unit to emit light of different wavelengths, e.g. at 10.6 µm and at 9.3 µm or 10.3 µm.

The different marking modules can be particularly flexibly used if the size of the respective marking modules is kept low. To this end, a marking module with gas lasers comprises resonator tubes which are stacked on top of each other. For high beam intensities, long laser cavities are required. These may be provided space-savingly by arranging the resonator tubes containing the laser gas of the gas laser in a semi or full circle. That is, at least one marking module employs gas lasers as the marking technology and comprises resonator tubes which at least partially surround an inner area. Compared to a laser constituted of one straight resonator tube, this provides a particularly long laser cavity whereas the total length of a casing of the marking module is comparably small. The arrangement of the resonator tubes in a semi or full circle may comprise any arrangements in which an inner area is at least partially surrounded by the resonator tubes. In a space-saving arrangement, the inner area accommodates electronic components such as driver circuits for electrodes of the gas laser, and/or optical components, in particular a set of deflection means or a scanning device, for redirecting emitted laser beams. Cooling is also facilitated in this arrangement. Resonator tubes which are opposite the inner area are spaced from each other such that heat can be easily dissipated.

In an embodiment of the invention, a substantially arbitrary, that is flexible, number of marking modules can be connected to the base unit. For enabling the control unit to control these marking modules independent of their respective marking technologies, smart devices may be used which may either be accommodated in the base unit or in each of the marking modules. In the first case, the control unit may comprise a smart chip that is adapted to recognize a marking technology of any marking module connected to the base unit to allow the control unit to control marking modules of different marking technologies. Alternatively, each of the plurality of marking modules comprises a smart chip that is adapted to communicate with the control unit and which enables the control unit to control the respective marking module independent of the marking technology employed.

In an embodiment, at least one of the marking modules comprises a plurality of light emitting elements and a set of deflection means for individually rearranging each light beam emitted by the light emitting elements. The set may in particular comprise at least one deflection means per light emitting element. A deflection means may be a mirror, a lens or an optical waveguide such as a fiber or a hollow tube. In the case of the deflection means being mirrors, preferably two mirrors per light emitting element may be provided. Then an array of emitted light beams can be rearranged to any arbitrary array, e.g., a linear array that is rotated relative to the emitted array, an array with an altered beam separation between the light beams of the array, or a two dimensional array. The set of deflection means may be adjustable to vary a beam separation of the light beams emitted by the light emitting elements. The deflection means can be automatically adjusted by the control unit. The deflection means may to this end be gimbal-mounted. The marking device of these embodiments may be well-suited for a particularly broad field of applications.

In still another embodiment of the invention, at least one marking module comprises a plurality of light emitting elements and a scanning device for positioning light beams emitted by the plurality of light emitting elements on the object. The scanning device may comprise one rotatable mirror, or two rotatable mirrors arranged with their axes perpendicular to each other. The scanning device may comprise two galvanometer scanners.

Each marking module may be equipped with a scanning device. Then moving the marking modules relative to each other for positioning their respective light beams is often made superfluous.

However, it may still be provided that a marking module, in some embodiments, each marking module, is equipped with a motor device for moving the respective marking module relative to the base unit. The marking modules can then be moved independently from one another. This allows for a flexible use of the marking modules. Furthermore, a printing resolution, which is to be understood as the number of dots that can be printed in one direction, can be increased.

The control unit may be adapted to drive the motor devices to move the at least two marking modules into positions in which their fields of view border each other. The bordering fields of view may be understood such that a spacing between two neighbouring light beams of one marking module is the same as the spacing between those two light beams of different marking modules that are closest to each other. The spacing may be determined at a distance to the marking device at which the object is to be positioned.

In other words, at least two of the marking modules are arranged such that light beams emitted by these marking modules impinge on adjacent areas of the object. The number of dots or lines that can be simultaneously marked on the object may then be increased.

Another embodiment of the invention is characterized in that two marking modules are arranged on opposite sides of an object movement path such that a front and a back side of the object can be marked simultaneously with said two marking modules. The object movement path may be defined by a conveyor or a rotating table onto which the object is placed.

The control unit may be adapted to drive a motor device to tilt each of the marking modules individually for tilting arrays of light beams emitted by the marking modules relative to an object movement direction of the object to be marked. A beam separation in a direction perpendicular to an object movement direction can thus be varied.

This may be advantageous independent of the concrete arrangement of the light emitting devices. In the following, an example with the light emitting devices being arranged in a line, i.e. a one-dimensional array, will be considered. The object is moved in an object movement direction relative to the marking module. The spacing between markings produced on the object in a direction perpendicular to the object movement direction is governed by the tilt angle. In detail, the spacing between markings may be proportional to the tangent of the tilt angle times the pitch between the light emitting devices. The distance between markings is at a maximum if the tilt angle is 90°, i.e. the line of light emitting devices is perpendicular to the object movement direction. The smaller the tilt angle, the smaller the spacing between the markings. Naturally, tilting leads to an offset between the light emitting devices in the object movement direction. However, this can be compensated by delaying the activation of the individual light emitting devices appropriately.

Each marking module may be understood as a separate casing containing the respective components. The casings may be interconnected with umbilical cables or may be each connected to the base unit. It is also possible that a plurality of marking modules is accommodated in a common housing.

According to still another embodiment of the invention, a sensor is provided which is adapted to detect the presence of the object to be marked. A relative positioning between the sensor module and the base unit may be possible. The sensor may deploy any adequate sensor technology such as a proximity switch, an active or passive optical sensor or an ultrasonic sensor. The sensor may be adapted to determine the position and the shape of the object. Information on the shape facilitates the positioning of the marking modules in order to mark the object at a desired part. Instead of moving the marking modules, light beams emitted by the marking modules may also be positioned on the object with scanning devices.

Accordingly, an optical sensor with spatial resolution for detecting a relative position between the object and the marking device may be provided, and the control unit may be adapted to position light beams emitted by the marking modules on the object according to detection information of the optical sensor.

For determining the orientation of a marking module relative to the object, the respective marking module may be adapted to emit a pilot light beam which does not cause a marking on the object. A light spot of the pilot light beam impinging on the object can then be detected by the sensor, e.g. with a camera.

In an embodiment, the sensor is attached to a marking module. This may define the relative position between the sensor and said marking module, rendering the determination of a relative position between the sensor and the marking module obsolete.

In an embodiment, a light detector is provided for detecting markings produced on the object, and the control unit is adapted to verify whether the markings produced on the object are correct based on detection signals of the light detector. This light detector may be formed by the afore-described sensor or light sensor. Alternatively, the light detector and the optical sensor are accommodated independently from each other in separate casings.

Another embodiment of the inventive marking device is characterized in that the sensor and/or the light detector is further adapted to determine a speed of the object. The speed of the object is a determinant for the distance of markings in the object movement direction. The control unit may thus be adapted to control the frequency of activation of the marking modules dependent on the determined speed of the object. A desired distance between markings in the object movement direction produced by one marking module can then be achieved. Additionally or alternatively, the control unit may be adapted to move or tilt the marking modules with the motor device in order to track or chase the object.

The control unit may be adapted to select and activate at least one marking module out of the plurality of marking modules of different marking technologies based on the detection information of the optical sensor. If an object comprising different materials is detected, marking modules employing different marking technologies may be activated simultaneously.

BRIEF DESCRIPTION OF THE DRAWINGS

The invention is described in greater detail below by reference to preferred embodiments which are illustrated in the attached drawings in which:

FIGS. 2a to 2c show schematically other arrangements of two marking modules of an inventive marking device, and markings thus produced;

FIGS. 3a to 3c show schematically still other arrangements of two marking modules of an inventive marking device, and markings thus produced;

Equivalent components are referred to in all figures with the same reference signs, respectively.

DETAILED DESCRIPTION OF THE INVENTION

Figure 1A:
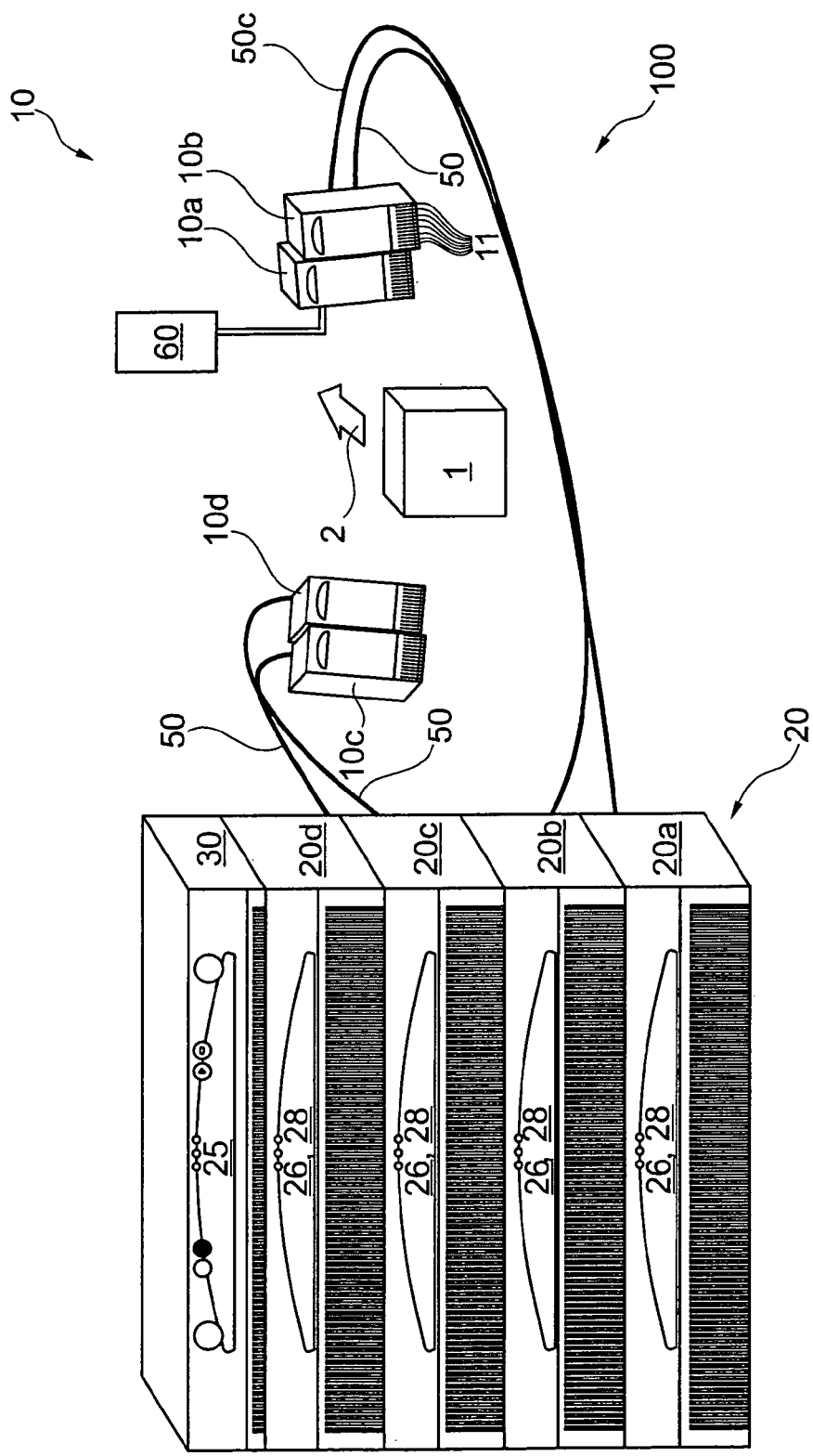
FIG. 1a shows a schematic perspective view of a first embodiment of an inventive marking device in which marking modules are positioned in a first arrangement.

The inventive marking device will be described with reference to FIGS. 1a and 1b which show schematic perspective views of a first embodiment of an inventive marking device 100. The marking device 100 comprises a plurality of marking modules 10 for emitting marking light to mark an object 1. The difference between FIG. 1a and FIG. 1b resides in the positioning of the marking modules 10.

Referring again to both Figures, the marking device 100 further comprises a base unit 20 with a control unit 25 for controlling the marking modules 10. The base unit may also serve for supplying the marking modules 10 with power and possibly with cooling fluid.

In the depicted examples, the plurality of marking modules 10 comprises four marking modules 10a-10d. Each marking module 10a-10d has a plurality of light emitting devices 11. Of these devices 11, the exit lenses or output optics 11 that emit the respective light beams for marking the object are shown.

The plurality of marking modules 10 comprises at least a first marking module 10a and a second marking module 10c which employ different marking technologies. That is, the light emitting devices 11 of these marking modules 10a, 10c are of different kinds. In the embodiment shown, the light emitting devices 11 of the marking modules 10a, 10b are gas lasers, e.g. $CO_2$-lasers which emit light with a wavelength of either 9.3 µm or 10.6 µm. The marking modules 10c, 10d have laser diodes as light emitting devices. These emit light with a wavelength different to the one of the gas laser modules 10a, 10b, for instance light with a wavelength of 1 µm, in particular with 940 nm, 950 nm or 970 nm.

The control unit 25 is adapted to activate each of the marking modules 10a-10d, independent of the marking technology of each marking module 10a-10d. This is achieved with a smart chip of the control unit 25. The smart chip may comprise a storage in which the relevant data for identifying and for controlling the marking modules with different marking technologies are stored. It is then not necessary for a user to input which kind of marking module is connected to the base unit. Additionally or alternatively, each marking module 10 may be equipped with one smart chip. The smart chips then communicate with the control unit of the base unit to transmit identification information of the respective marking modules 10. The control unit 25 subsequently generates and sends marking commands to the marking modules, i.e. it activates the marking modules 10 according to a sign that is to be marked.

The output optics 11 of at least one of the marking modules 10 are arranged in one line, i.e. the emitted light beams form a one-dimensional array. In the depicted example, each marking module 10a-10d has its output optics 11 arranged in one line.

The laser beams of any one marking module 10a-10d thus create dots or marking spots on the object which dots are located in a one-dimensional array. By moving the object 1 in an object movement direction 2 which is not parallel to said one-dimensional array, any two-dimensional pattern can be printed on the object 1.

The marking modules 10 are positioned such that they produce markings on a desired portion of the object's surface. For this positioning, a motor device 60 may be provided. With the motor device 60, the marking modules 10a-10d can be moved independently from each other. The control unit 25 may also be adapted for controlling the motor device 60.

In the depicted example, the control unit 25 is housed in a separate casing 30 and constitutes a control module 30. A power supply 26 and cooling devices 28 for the marking modules 10 are then not provided in the casing of the control module 30.

Rather, for each marking module 10a-10d one suitable base module 20a-20d is provided. The base modules 20a-20d each house a power supply 26 that is adequate to power exactly one of the marking modules 10a-10d. Depending on the kind of marking module 10 and the number of light emitting devices 11 thereof, the energy consumption may vary considerably. As the power supplies 26 do not provide any excess power for other marking modules, design and cost demands are advantageously reduced.

Furthermore, the base modules 20a-20d may comprise cooling devices 28 for cooling the marking modules 10a-10d. Depending on the technology of the respective marking modules 10a-10d, the demands on cooling may differ. Air cooling may, for instance, suffice for the laser diode modules 10c, 10d. In that case, the respective base modules 20c, 20d do not comprise any cooling devices. The gas laser modules 10a, 10b however impose higher demands on cooling. Therefore, the pertaining base modules 20a, 20b do comprise cooling devices 28. The cooling devices 28 have a pump for conveying a cooling fluid to the respective marking module 10a, 10b. For cooling the cooling fluid to ambient temperature, the cooling devices 28 comprise cooling fins. If the requirements on cooling are higher, an active cooling means, e.g. a peltier-element, may be provided.

For conveying the electrical power and possibly the cooling fluid from the base modules 20a-20d to the marking modules 10, each of the base modules 20a-20d is connected to its marking module 10a-10d via an umbilical cable 50. These cables comprise power lines, cooling lines and, additionally, signal lines for conveying the marking commands of the control module 30. As the control module 30 and the base modules 20 have separate housings, the control unit 25 is not directly connected to the umbilical cables 50. Rather, the control unit 25 transmits the signals to the base modules 20 to which the umbilical cables 50 are connected.

To this end, the control module 30 provides a number of connecting elements for electrical cables. These cables are then connected to the base modules 20a-20d. The number of connecting elements thus constitutes an upper limit of base modules 10 that can be deployed and may be at least 8, e.g. 16. Alternatively, the base modules may be arranged in a chain to the control module, i.e. only one base module is directly connected to the control module.

The control unit 25 is adapted to automatically identify any connected base module 20a-20d. That is, the control unit 25 determines whether the connected base module is configured for supply of e.g. a laser diode module 10c, 10d or a gas laser module such as a $CO_2$-laser module 10a, 10b.

Turning again to the arrangement of the marking modules 10a-10d, benefits resulting from the modular design will be explained. Especially, some of the advantages due to the small width of the modules and the arrangement of the output optics 11 will be described. The output optics 11 are located at a front side of the casing. They are spread almost from one front edge to the opposite front edge, the front edges being the edges between the front side and a lateral side. That is, a distance between a front edge and the output optics which is closest to that front edge is smaller than a pitch between the output optics. Said distance may be at most half the pitch between the output optics. As a consequence, when a first and a second marking module 10a, 10b are arranged with their lateral sides touching each other, a distance between an output optics 11 of the first marking module 10a and an output optics 11 of the second marking module 10b is equal to the distance between neighboring output optics 11 of one of the marking modules 10. The array of light beams of the marking module 10a may form together with the light beams of the marking module 10b one uniform array of light beams in which any two neighboring light beams have the same pitch.

In the following, the difference between the arrangements of the FIGS. 1a and 1b will be described. In the example depicted in FIG. 1a, the marking modules 10a, 10b and the marking modules 10c, 10d are arranged on different sides of an object movement path. A front side of the object 1 can then be marked with the marking modules 10a, 10b, while a backside of the object 1 can be marked with the other marking modules 10c, 10d.

Figure 1B:
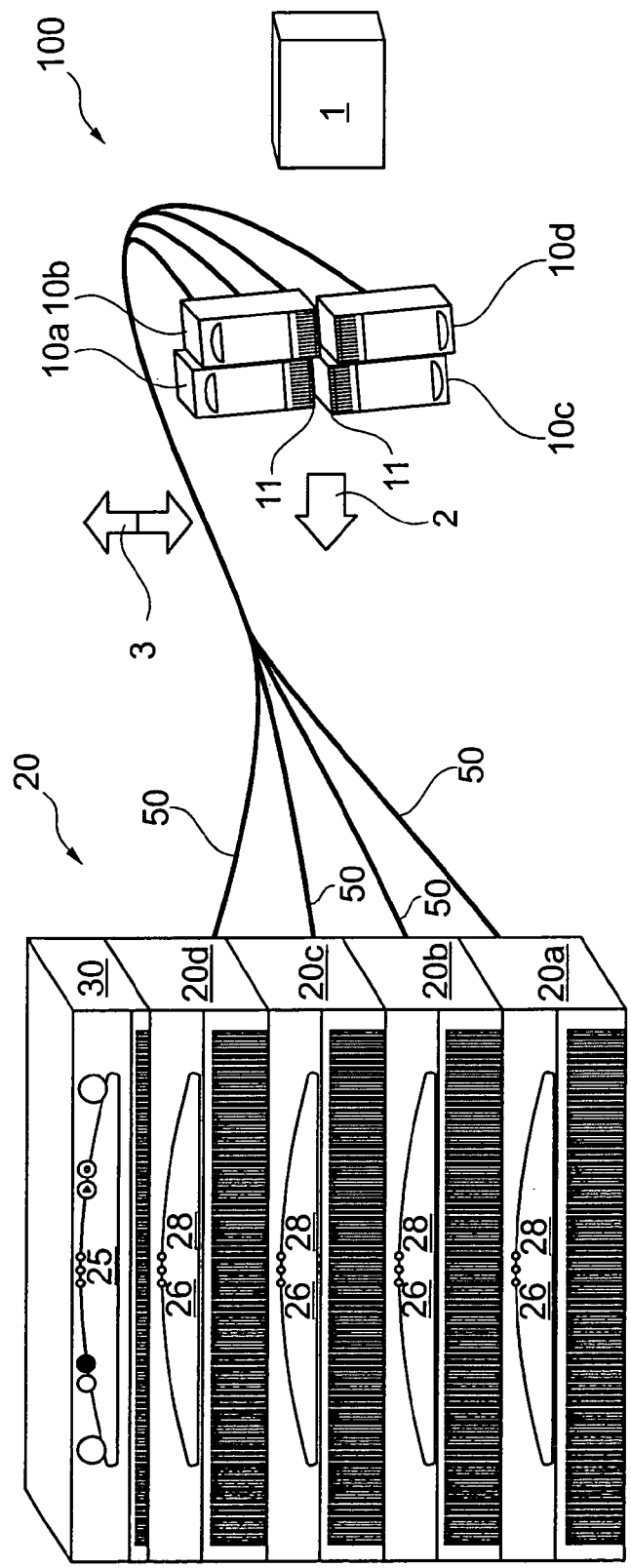
FIG. 1b shows a schematic perspective view of the first embodiment of an inventive marking device in which marking modules are positioned in a second arrangement.

Contrary, in the situation shown in FIG. 1b, the marking modules 10a-10d are arranged directly next to each other for printing together one sign.

The line of output optics 11 of each marking module 10a-10d is slightly tilted with regard to the object movement direction 2. In a direction 3 perpendicular thereto, that leads to a small offset between the output optics 11 of one marking module 10. This small offset is significantly smaller than the pitch between the output optics 11. A high printing resolution in the direction 3 perpendicular to the object movement direction 2 may thus be achieved. The number of dots in the direction 3 is, however, limited by the number of light emitting devices or output optics 11 of one marking module 10. To overcome this limitation, two marking modules 10a, 10b are arranged next to each other in the object movement direction 2 and slightly offset in the direction 3 perpendicular thereto. With the line of output optics 11 being tilted to the object movement direction 2, this results in each output optics 11 being at a different position regarding the direction 3. The other pair of marking modules 10c, 10d is again tilted and also offset to the marking modules 10a, 10b in the direction 3. Hence, the number of dots that can be created in the direction 3 is equal to the total number of light emitting devices of all marking modules 10a-10d. The pitch between the dots in the direction 3 can be set to generally any value by adjusting the tilt angle.

Other arrangements of the marking modules 10a, 10b and the markings thus produced are shown in FIGS. 2a to 2c and FIGS. 3a to 3c. In any case, each marking module 10a, 10b is tilted by a tilt angle α relative to the object movement direction 2. The output optics and hence the light beams of each marking module 10 are consequently slightly offset in the direction 3 perpendicular to the object movement direction 2. Any marking module 10a, 10b can therefore print a line of code which consists of a number of dots in the direction 3 equal to the number of light emitting devices of the modules 10. In the depicted examples, each marking module 10a, 10b comprises nine light emitting devices and the lines of code, i.e. the markings, thus consist of nine dots in the direction 3.

Turning now to FIGS. 2a and 2b, two different arrangements of the marking modules 10a, 10b are shown which allow printing of separated lines of code 4a, 4b, as depicted in FIG. 2c. That is, the marking modules 10a, 10b are spaced far enough in the direction 3 such that the distance between those output optics of the marking modules 10a, 10b that are closest to each other is larger than the offset between output couplers of one module in the direction 3. This results in two lines of code 4a, 4b, each being printed by one of the marking modules 10a, 10b. The marking modules 10a, 10b may be offset to each other in the object movement direction 2, as shown in FIG. 2a, or one of the modules may be placed upside down as depicted in FIG. 2b.

At least a position in the direction 3 perpendicular to the object movement direction 2 can then be adjusted with a motor device which is controlled by the control unit.

In FIGS. 3a and 3b, the marking modules 10a, 10b of the FIGS. 2a, 2b are moved closer to each other in the direction 3. Now the distance between two output couplers of one of the marking modules 10a, 10b is equal to the distance from one output coupler of the marking module 10a to an output coupler of the other marking module 10b. Thus, one line of code 4c can be printed, as depicted in FIG. 3c. This line of code 4c consists of 18 dots which have a common spacing in the direction 3. This may allow for printing of complex signs, such as data matrix barcodes or Asian letters.

The control unit may be adapted to move the marking modules between any of the positions depicted in the Figures, in particular between the positions shown in FIGS. 2a and 3a and/or 2b and 3b. This may be carried out by the control unit automatically according to the line of code that is to be printed.

Figure 4:
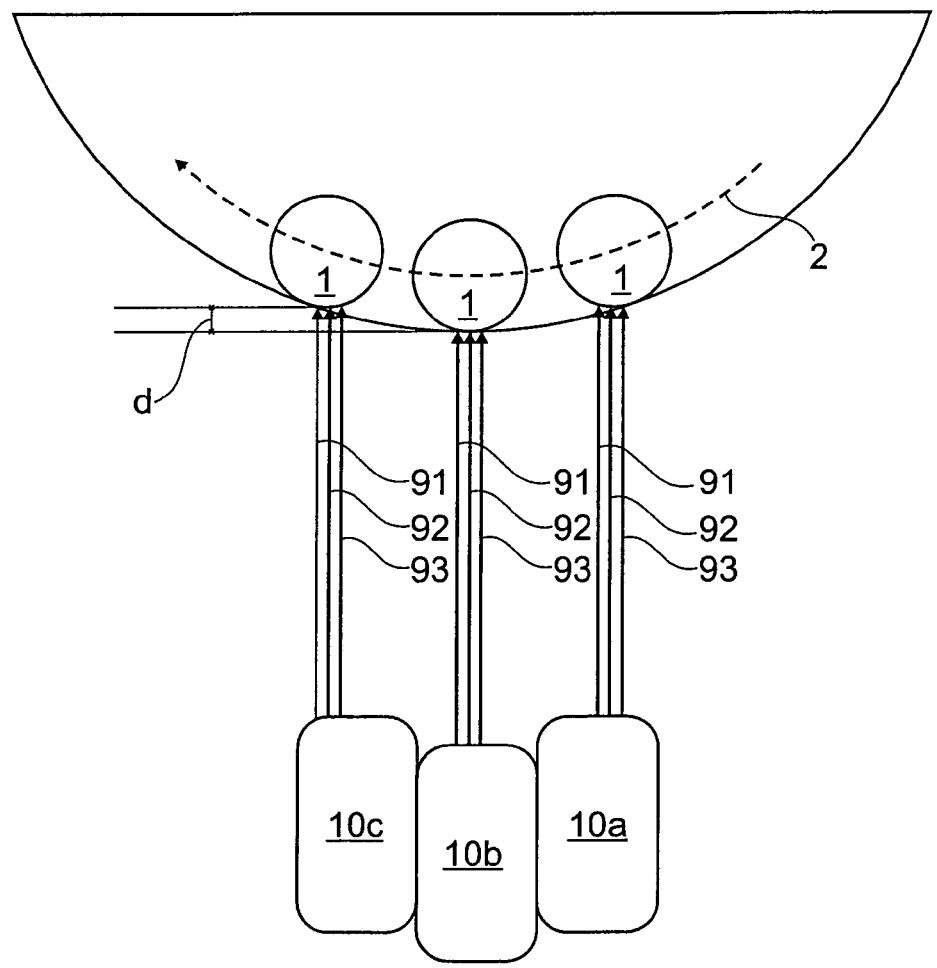
FIG. 4 shows another arrangement of marking modules relative to an object to be marked.

Referring now to FIG. 4, another arrangement of marking modules 10 of the inventive marking device is shown. This time three marking modules 10a, 10b, 10c are provided.

An object 1 is moved in an object movement direction 2 in a round trajectory, e.g. on a rotating table. The object 1 is shown at three positions, i.e. at three different points in time.

Due to the round trajectory of the object 1, its distance to any of the marking modules varies. This difference in distance is indicated with the reference sign d in one direction. The three marking modules 10a, 10b, 10c are arranged corresponding to the trajectory of the object such that they have a common distance to the positions on the trajectory at which their light beams 91-93 impinge on the object 1. This facilitates focusing of the light beams 91-93 and leads to a common spot size of the light beams 91-93 on the object.

Figure 5:
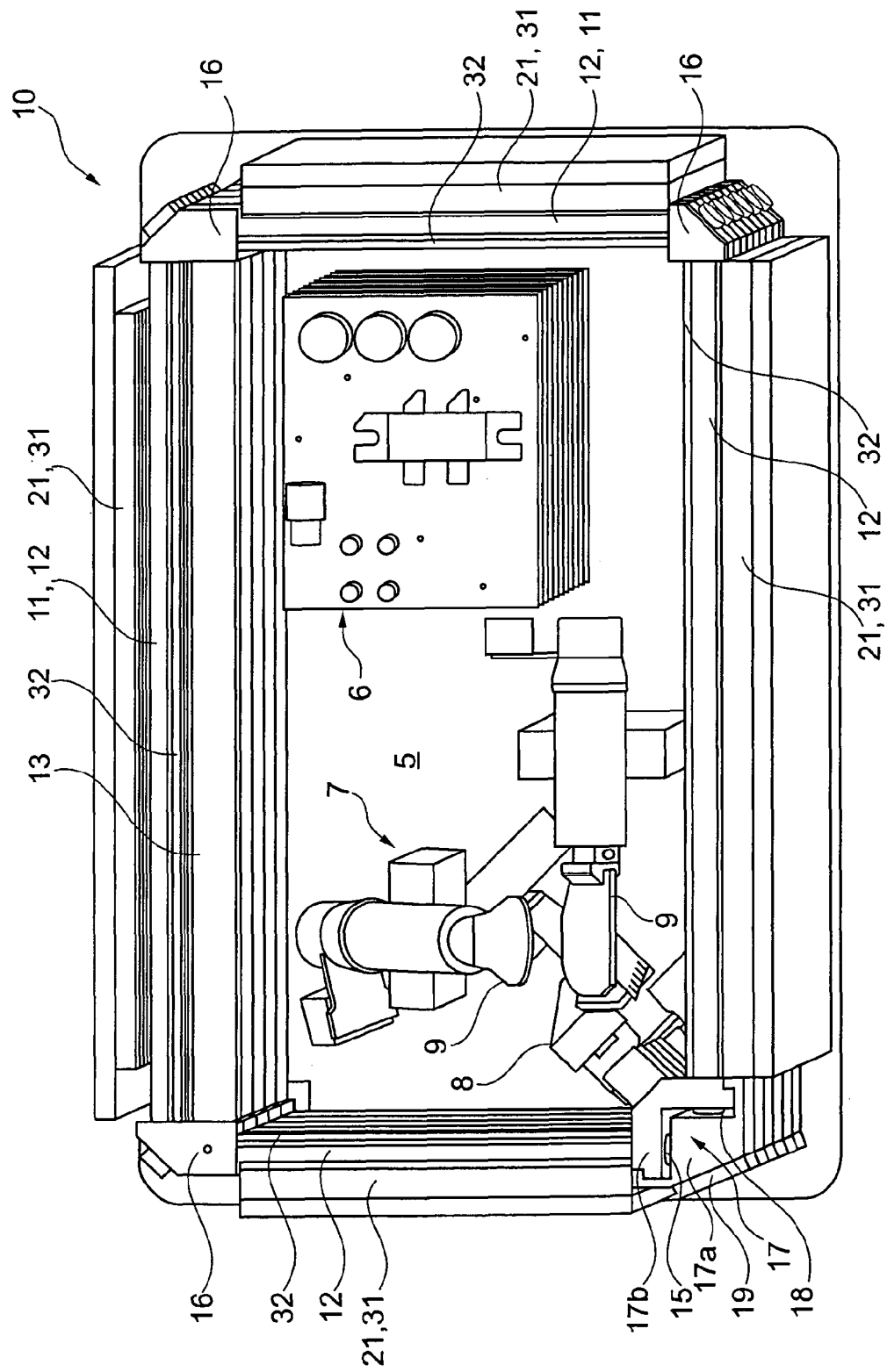
FIG. 5 shows schematically a marking module of an inventive marking device.

Referring to FIG. 5, a marking module 10 of an inventive marking device 100 is schematically shown. This marking module 10 is a gas laser module 10, i.e., it has a plurality of gas lasers 11 as light emitting devices. In the depicted example, the plurality of gas lasers 11 comprises nine gas lasers. These are arranged on top of each other. That is, above each resonator tube of a first gas laser a resonator tube of a second gas laser is placed.

Each gas laser 11 comprises a plurality of resonator tubes 12, e.g., four resonator tubes 12 arranged in a rectangle. Generally, any number of resonator tubes may be provided which are arranged in a convex or circle-like fashion.

In three corners of the rectangle, connecting elements 16 for connecting adjacent resonator tubes 12 are provided. These connecting elements 16 are formed as hollow tubes such that one common gas volume is formed with the resonator tubes 12. The common gas volume is sealed to avoid leakage of the laser gas.

It may be beneficial that a gas mixture received in the common gas volume remains constant, as changes may decrease the laser efficiency. To slow down changes, an additional gas reservoir, namely a gas tube 13, is provided. This gas tube 13 is filled with laser gas but is not equipped with electrodes, i.e., gas within the gas tube 13 is not excited during the operation of the laser 11. The gas tube 13 is arranged parallel to one of the resonator tubes 12 and forms a common gas volume with the resonator tubes 12. To this end, at least two of the connecting elements 16 comprise a further opening to which the gas tube 13 is connected.

In the fourth corner of the rectangle, the adjacent resonator tubes 12 are supported by a connecting element 17 which houses a rear mirror 15 and an output coupler 18. In the example shown, the gas volume is terminated with the rear mirror 15 on one side and with the output coupler 18 on the other side such that there is no gas connection within the connecting element 17.

The connecting element 17 is formed by a first and a second connecting part 17a, 17b. The second connecting part 17b has two openings per gas laser for connection of the resonator tubes 12 of the gas lasers. Furthermore, the second connecting part 17b has two additional openings per gas laser which openings are closed with the rear mirror 15 and the output coupler 18. Beam delivery means 19 such as mirrors 19 are attached to the first connecting part 17a for redirecting laser beams emitted through the output couplers 18 into an inner area 5 which is at least partially enclosed by the resonator tubes 12.

In the inner area 5, further optical elements 7 as well as electronic components 6 are disposed. The optical elements 7 may comprise a set of deflection means 8 having at least one, in some cases at least two, deflection means per gas laser. The deflection means may be adjustable mirrors or optical waveguides. The set of deflection means 8 thus allows for individually redirecting each of the emitted laser beams. The optical elements 7 may further comprise one or two galvanometer scanners 9, each having one mirror onto which the laser beams of all gas lasers impinge. With the galvanometer scanners 9, the laser beams can be scanned within the field of view of the marking module 10.

Referring now to the plurality of gas lasers 11, these may share common connecting elements 16, 17. Then each connecting element 16 comprises openings for connection of two resonator tubes per gas laser. In the depicted embodiment with nine lasers, that is eighteen openings. The gas volumes of different gas lasers may be interconnected within the connecting elements 16. This may enhance the stability of the laser gas mixture, as a gas change within the resonator tubes of one gas laser is spread and thus diluted over all gas lasers. Furthermore, by interconnecting the gas volumes of different lasers within the connecting elements 16, one gas tube 13 with additional gas suffices for all lasers 11.

For redirecting laser light from one resonator tube 12 of one gas laser to another resonator tube 12 of the same laser, each connecting element 16 comprises a mirror. The connecting elements 16 may have an additional opening such that the mirror can be attached at that opening from outside. This facilitates production of the marking apparatus.

The common connecting element 17 comprises one output coupler 18 and one rear mirror 15 per gas laser. Manufacture is further eased if the common connecting element 17 comprises additional openings which are closed with the output couplers 18 and/or the rear mirror 15. That is, the common connecting element 17 may have openings at four sides; at two of these sides the resonator tubes 12 are connected, whereas the output couplers 18 and the rear mirrors 15 are attached from outside to the openings of the remaining two sides.

Each resonator tube 12 of each of the gas lasers 11 is equipped with its own pair of electrodes 31, 32 for exciting the laser gas. With the resonator tubes 12 being stacked, the electrodes 32 facing the inner area and the electrodes 31 on the opposite side of the resonator tubes 12 are likewise stacked. All electrodes 32 of one stack of resonator tubes may be located in or on one first common substrate. The electrodes 31 of one stack of resonator tubes are likewise arranged in or on a second common substrate.

On the outer side of the resonator tubes 12, i.e. the side of the resonator tubes 12 opposite the inner area 5, heat dissipaters 21 are provided. The heat dissipater 21 may comprise microchannels for receiving a cooling fluid. Each stack of resonator tubes 12 may be thermally connected to one common heat dissipater 21.

Figure 6:
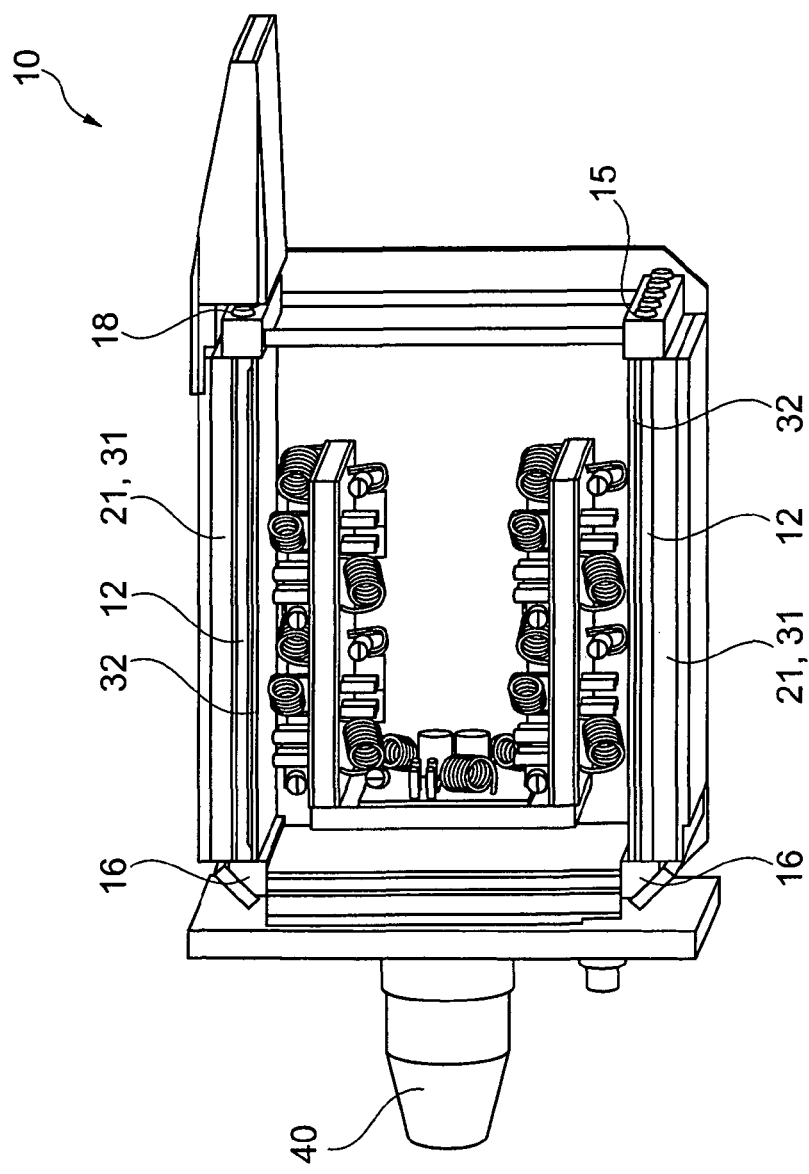
FIG. 6 shows schematically another marking module of an inventive marking device.

In FIG. 6, another embodiment of a marking module 10 of an inventive marking device is shown. Here, each gas laser comprises three resonator tubes 12 which are arranged in a U-shape. The space between the two legs of this U-shape is to be understood as the inner area 5. The U is terminated at one end with a first connecting element at which the rear mirrors 15, but not the output couplers 18 are attached. Analogously, the U is terminated at the other end with a second connecting element at which only the output couplers 18 but no rear mirrors 15 are provided.

A connector 40 such as a female or male jack for connecting an umbilical cable is provided. Via this connector 40 cooling fluid can enter the apparatus and can be guided through the microchannels. After being warmed in the microchannels, the cooling fluid can exit the apparatus through the connector 40. The connector 40 further comprises electrical contacts such that the marking module 10 can be supplied with electrical power and electrical signals via the umbilical cable.

Figure 7:
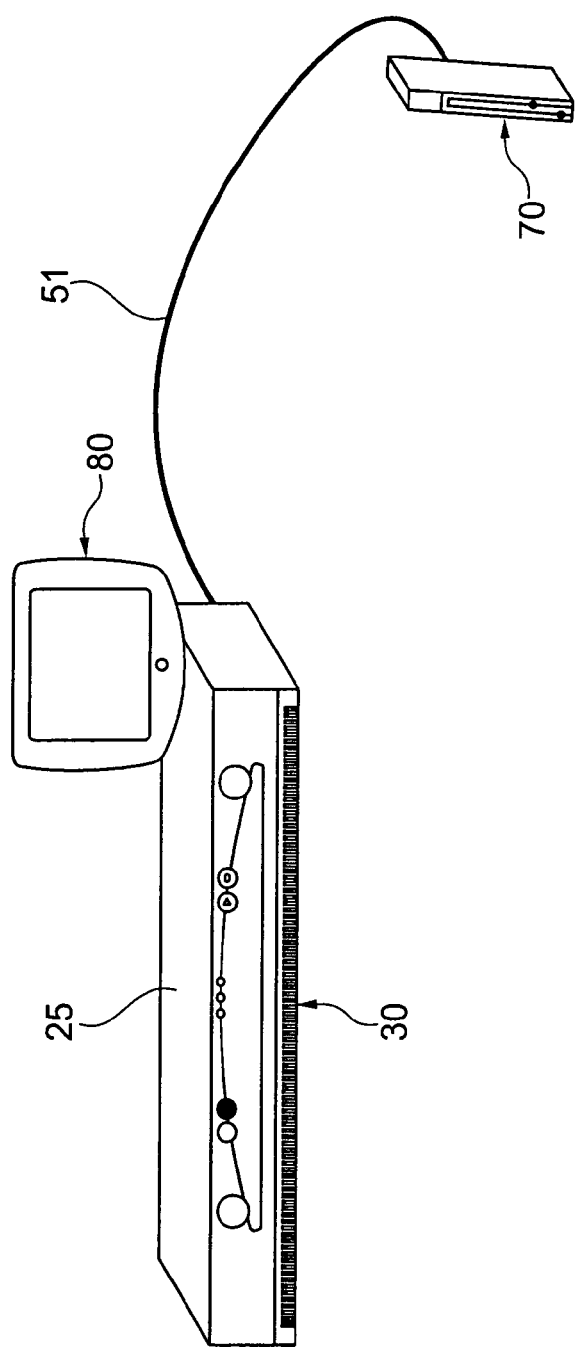
FIG. 7 shows schematically a control module, a sensor, and a display of an inventive marking device.

Turning now to FIG. 7, a control unit 25, a sensor 70, and a display 80 of an inventive marking device are depicted.

The control unit 25 is housed in a control module 30 to which the sensor 70 and the display 80 are connected. The control unit 25 may be adapted to display data such as an ID of the connected marking modules and their respective marking technologies. Furthermore, a menu for selecting printing settings may be displayed. A user may enter a command via the display which is then a touch screen, or via another peripheral device. Alternatively, the control unit 25 may receive commands via a network connection.

In the depicted example, the sensor 70 is a sensor module 70 which is connected via an electrical cable 51 to the control module 30. The sensor module 70 serves for determining a position of the object 1 and in some cases also its speed. To this end, any adequate sensor technology may be used, e.g. an ultrasonic transducer or a light sensor.

The sensor module 70 may comprise a camera and may thus also be referred to as an optical sensor. The marking modules may be equipped with a pilot light source, i.e. a light source that emits a pilot light beam parallel to the light beams used for marking. In contrast to the marking light beams, the pilot light beam does not produce a marking, i.e. a permanent change in the object's surface, but merely a light spot. This spot can be detected with the camera and indicates an area on the object at which the light emitting devices used for marking are pointed. The control unit is thus enabled to determine the relative position between the respective marking module and the object and the orientation of the marking module to the object. The control unit may further be adapted to position light beams emitted by the marking modules on the object according to detection information of the optical sensor.

The control unit is further adapted to determine which marking technology is suited for the concrete marking task based on the detection information of the optical sensor. The corresponding marking modules are then activated by the control unit.

The control unit 25 may be adapted to determine the position and in some cases the speed of the object based on measured information of the sensor 70. The control unit 25 may also be adapted to move the sensor module 70 via a motor device.

The marking device may further comprise a light detector which may in principle be identically built to the optical sensor. The light detector is arranged such that it detects markings produced on the object. The control unit can then verify whether the markings produced on the object are correct based on detection signals of the light detector.

The marking device herein described allows marking of an object in a broad variety of different applications. This is achieved by employing at least two different marking technologies in one marking device. Light beams with an adequate wavelength or beam power for marking the individual objects can thus be produced. In particular, it is advantageously made possible to mark an object comprising different substrates with only one marking device.

The invention claimed is:

1. A marking device for marking an object with marking light, the marking device comprising:
   a plurality of marking modules for emitting marking light; and
   a base unit to which the plurality of marking modules is connected, wherein the base unit comprises a control unit for controlling the plurality of marking modules, wherein:
   the plurality of marking modules comprises at least a first marking module and a second marking module which employ different marking technologies for marking an object comprising different materials,
   the different marking technologies of the marking modules belong to a group comprising: lasers and diodes; or solid state lasers, laser diodes, vertical-cavity surface emitting lasers and gas lasers, and
   each of the plurality of marking modules is provided with a scanning device for positioning the respective light beam on the object or the marking modules are movable independently from one another,
   wherein the base unit includes a plurality of data transmission connectors to which a flexible number of marking modules can be connected, wherein each marking module includes a smart chip including information on the marking technology of the respective marking module, wherein the control unit is configured to read the smart chips of all marking modules currently connected to the connectors to determine which kind of marking technology is connected to each connector.

2. The marking device according to claim 1, wherein the marking technologies of at least two marking modules differ in that the marking light emitted by the at least two marking modules have different wavelength regions.

3. The marking device according to claim 1, wherein at least one of the marking modules comprises a plurality of light emitting elements and a set of deflection means for individually rearranging each light beam emitted by the plurality of light emitting elements.

4. The marking device according to claim 3, wherein the set of deflection means is adjustable to vary a beam separation of the light beams emitted by the light emitting elements.

5. The marking device according to claim 1, wherein for increasing the number of dots or lines that can be simultaneously marked on the object, at least two of the marking modules are arranged such that light beams emitted by these at least two marking modules impinge on adjacent areas of the object.

6. The marking device according to claim 1, wherein at least one marking module comprises a plurality of light emitting elements and a scanning device for positioning light beams emitted by the plurality of light emitting elements on the object.

7. The marking device according to claim 1, wherein at least one marking module employs gas lasers as the marking technology and comprises resonator tubes which at least partially surround an inner area, and
   at least one of: electronic components or optical components are arranged in the inner area.

8. The marking device according to claim 1, wherein:
   an optical sensor with spatial resolution for detecting a relative position between the object and the marking device is provided, and
   the control unit is configured to position light beams emitted by the marking modules on the object according to detection information of the optical sensor.

9. The marking device according to claim 8, wherein the control unit is configured to select and activate at least one marking module out of the plurality of marking modules of different marking technologies based on the detection information of the optical sensor.

10. The marking device according to claim 1, wherein a light detector is provided for detecting markings produced on the object, and the control unit is configured to verify whether the markings produced on the object are correct based on detection signals of the light detector.

11. The marking device according to claim 1, wherein for varying a beam separation in a direction perpendicular to an object movement direction, the control unit is configured to tilt each of the marking modules individually such that an array of light beams emitted by the respective marking module is tilted relative to the object movement direction.

12. The marking device of claim 1, wherein each of the plurality of marking modules has its own beam path separate from a beam path of each of the other of the plurality of the marking modules.

* * * * *